(12) United States Patent
Twerdochlib

(10) Patent No.: US 9,014,460 B2
(45) Date of Patent: Apr. 21, 2015

(54) APPARATUS TO MEASURE BLADE VIBRATION IN A TURBINE ENGINE BASED ON SERIES OF IMAGES EXPOSED BY AN IMAGER IN RESPONSE TO A SEQUENCE OF ILLUMINATION BURSTS

(75) Inventor: Michael Twerdochlib, Oviedo, FL (US)

(73) Assignee: Siemens Energy, Inc., Orlando, FL (US)

( * ) Notice: Subject to any disclaimer, the term of this patent is extended or adjusted under 35 U.S.C. 154(b) by 504 days.

(21) Appl. No.: 13/290,297

(22) Filed: Nov. 7, 2011

(65) Prior Publication Data

US 2013/0115050 A1 May 9, 2013

(51) Int. Cl.
G06K 9/00 (2006.01)
F01D 21/14 (2006.01)
G06T 7/00 (2006.01)
G01H 1/00 (2006.01)
G01M 13/02 (2006.01)
G01H 9/00 (2006.01)
G06T 7/20 (2006.01)
F01D 5/26 (2006.01)

(52) U.S. Cl.
CPC .............. *F01D 21/14* (2013.01); *G06T 7/0002* (2013.01); *G01H 1/003* (2013.01); *G01M 13/028* (2013.01); *G01H 9/004* (2013.01); *G06T 7/20* (2013.01); *F01D 5/26* (2013.01)

(58) Field of Classification Search
USPC ......... 382/100, 103, 107, 141, 152, 312, 325; 415/118; 73/1.82, 1.84, 35.01, 35.09, 73/66, 112.01, 114.09, 114.26, 456, 457, 73/462, 466, 467, 570, 649, 653–661; 70/33–35, 56; 396/155, 180; 356/26
See application file for complete search history.

(56) References Cited

U.S. PATENT DOCUMENTS

| | | | | |
|---|---|---|---|---|
| 4,887,468 A * | 12/1989 | McKendree et al. | ........... | 73/660 |
| 4,955,269 A * | 9/1990 | Kendig et al. | ................... | 73/577 |
| 5,511,426 A * | 4/1996 | Clement et al. | ................. | 73/655 |
| 5,761,956 A * | 6/1998 | Beeson et al. | ................. | 73/660 |
| 5,974,882 A * | 11/1999 | Heath | ............................. | 73/579 |
| 7,489,811 B2 | 2/2009 | Brummel et al. | | |
| 7,533,572 B2 | 5/2009 | Twerdochlib | | |
| 7,775,114 B2 | 8/2010 | Twerdochlib et al. | | |
| 7,836,772 B2 | 11/2010 | Twerdochlib | | |
| 7,903,140 B2 | 3/2011 | Metala et al. | | |
| 2006/0000283 A1 | 1/2006 | Twerdochlib | | |
| 2009/0046296 A1* | 2/2009 | Kilpatrick et al. | ............ | 356/484 |
| 2009/0078053 A1 | 3/2009 | Twerdochlib | | |
| 2009/0314092 A1 | 12/2009 | Twerdochlib | | |
| 2010/0074727 A1* | 3/2010 | Twerdochlib | ................. | 415/118 |
| 2010/0076703 A1* | 3/2010 | Twerdochlib | .................. | 702/56 |
| 2011/0069165 A1* | 3/2011 | Zombo et al. | ................... | 348/82 |
| 2011/0162457 A1* | 7/2011 | Sue et al. | ........................ | 73/655 |

OTHER PUBLICATIONS

Henry Jones, "Shedding Light on Vibration", Mechanical Engineering; Journal vol. 118; Journal Issue 11; Nov. 1996, pp. 94-97.*
T. Kawasima, H. Iinuma and N. Minagawa, "Optical Semiconductor Blade Vibration Monitoring System for Gas Turbine Engine", IEEE, Instrumentation and Measurement Technology Conference Proceedings, vol. 2, May 1994, pp. 601-604.*
P.B. Nagy, P. Greguss, Helicopter blade tracking by laser light, Optics and Laser Technology, Dec. 1982, 0030-3992/82/060299-04, 1982 Butterworth & Co. (Publishers) Ltd., pp. 299-302.

* cited by examiner

Primary Examiner — Eric Rush

(57) ABSTRACT

Apparatus (12) to measure blade vibration in a gas turbine engine (8). An illumination source (20) generates a sequence of illumination bursts in a field of view capturing a passing rotating blade (10) of the gas turbine engine. An imager (22) generates image data including a series of images capturing views of the passing rotating blade. The images are exposed in response to respective illumination bursts. A controller (30) is configured to process the series of images to identify one or more vibration modes of the rotating blade.

18 Claims, 3 Drawing Sheets

US 9,014,460 B2

APPARATUS TO MEASURE BLADE VIBRATION IN A TURBINE ENGINE BASED ON SERIES OF IMAGES EXPOSED BY AN IMAGER IN RESPONSE TO A SEQUENCE OF ILLUMINATION BURSTS

FIELD OF THE INVENTION

The present invention is generally related to measuring vibration in a turbine engine, and, more particularly, to apparatus to measure blade vibration in a turbine engine based on a series of images exposed by an imager in response to a sequence of illumination bursts.

BACKGROUND OF THE INVENTION

A high speed turbo engine, such as a steam or gas turbine, generally comprises a plurality of blades arranged in axially oriented rows, the rows of blades being rotated in response to the force of a high pressure fluid flowing axially through the engine. Due to their complex design, natural resonant mechanical frequencies of the blades may coincide with or be excited by certain blade rotational speeds and rotational harmonics thereof.

To prevent excessive vibration of the blade about its normal position, prudent design practice dictates that the blades be constructed such that the frequencies of the lowest modes fall between harmonics of the operating frequency of the turbine. In addition, the blades may be excited by non-synchronous forces such as aerodynamic buffeting or flutter. To avoid the vibration exceeding certain levels and setting up objectionable stresses in the blades, it is common to monitor the vibrations of the blades, both during the design and testing of the turbine and during normal operation of the turbine.

For example, it is known to use non-contacting proximity sensors or probes to measure blade vibrations. The probes may detect the actual time-of-arrival of each blade as if passes each probe and provide corresponding signals to a blade vibration monitor (BVM). Positional deviations due to vibration are extracted, from which the BVM may determine the amplitude, frequency, and phase of the vibration of each blade. The measured vibration amplitude is highly dependent on correct positioning of the sensor above the blade target, which may comprise a target affixed to the blade, a feature of the blade, or the blade tip itself. In a typical measurement, the probes may be positioned to sense the passage of a leading edge or trailing edge of the blades.

The difficulty in properly aligning a probe is increased by axial movements of the blades during operation, such as may occur as the rotor spins up or down, as the turbine warms up and cools down, as the load on the turbine changes, and due to torsional movements of the blades. At least in view of the foregoing considerations, it is desirable to provide an improved blade vibration measurement apparatus.

BRIEF DESCRIPTION OF THE DRAWINGS

The invention is explained in the following description in view of the drawings that show.

DETAILED DESCRIPTION OF THE INVENTION

Figure 1:
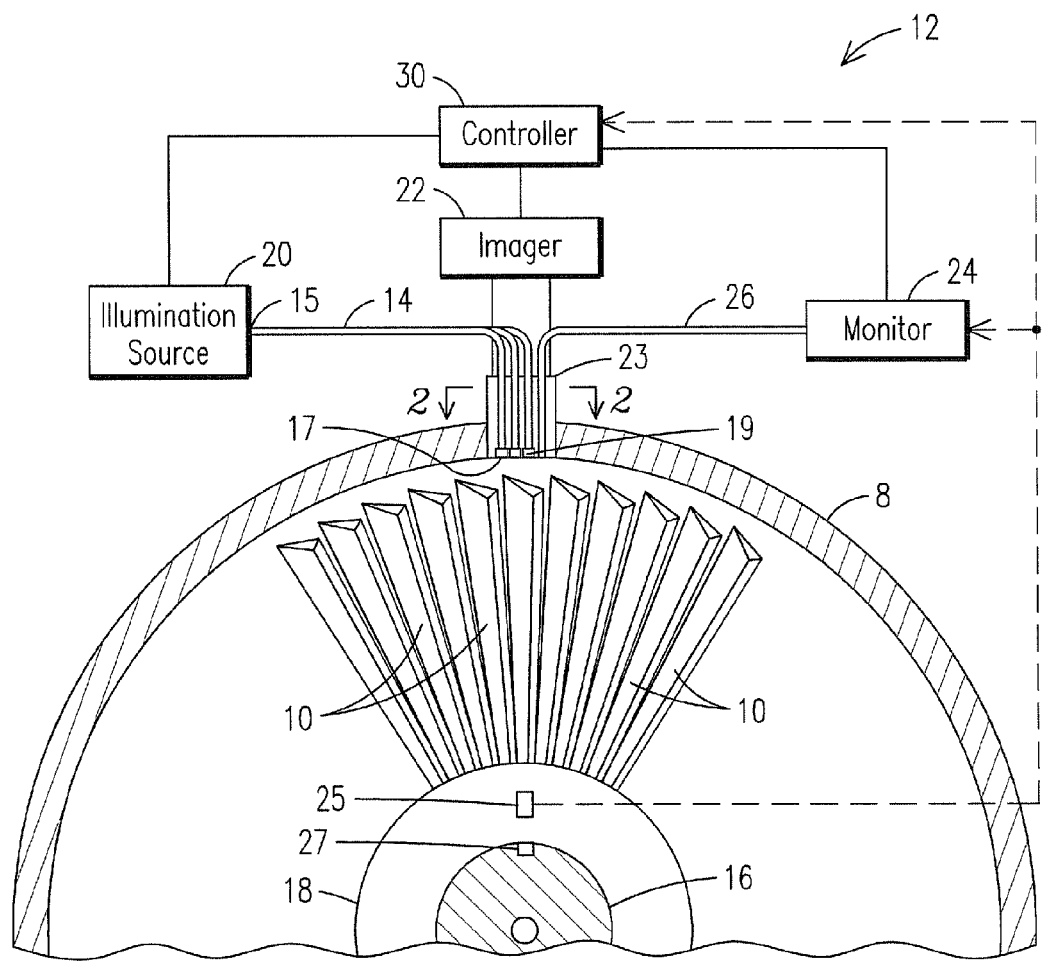
FIG. 1 diagrammatically illustrates a turbine engine, as may benefit from an apparatus embodying aspects of the present invention to measure vibrations of turbine blades.

FIG. 1 schematically illustrates a turbine engine 8, such as a steam or gas turbine engine, as may include a plurality of blades 10, which may be arranged in axially-spaced rows of blades. Turbine engine 8 may benefit from an apparatus 12 embodying aspects of the present invention, as may be employed to measure vibrations of rotating turbine blades 10. The turbine blades 10 may be connected to a rotor 16 (e.g., rotor shaft) by way of a rotor disk 18 and may form a blade structure within the turbine engine 8.

In one example embodiment, apparatus 12 includes an illumination source 20, such as may involve one or more pulsed laser sources, Xenon flash devices and the like, to generate a sequence of illumination bursts (e.g., illumination pulses) in a field of view capturing a passing rotating blade of the gas turbine engine.

Figure 2:
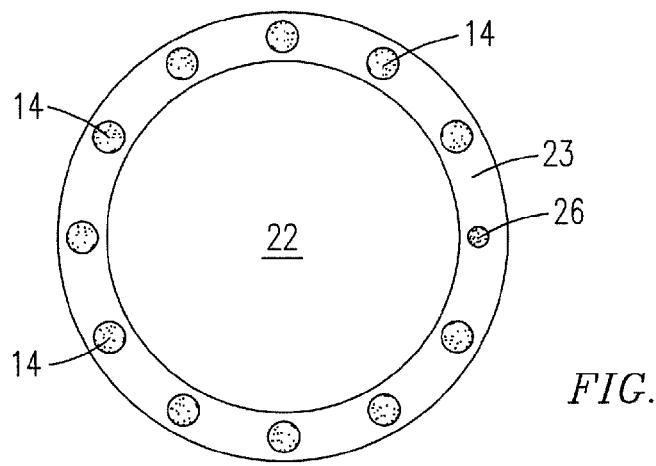
FIG. 2 is a cross-sectional view along line 2-2 in FIG. 1, illustrating a viewing probe as may include a bundle of optical fibers arranged to direct a sequence of illumination bursts (e.g., flashes) to one or more rotating blades and further illustrating an optical fiber arranged to direct an illumination spot to the blades.

In one example embodiment, a bundle of optical fibers 14 may have respective first ends 15 coupled to illumination source 20 and respective second ends 17 disposed along a periphery of a viewing probe 23 (as may be better appreciated in FIG. 2) to direct the illumination bursts to the field of view of the passing blade. In one example embodiment, a diffuser lens 19 may be disposed over the respective second ends 17 of the bundle of optical fibers 14.

Apparatus 12 further includes an imager 22, such as a digital camera including an array of charge coupling devices (CCDs) and the like, to generate image data, which is made up of a series of images capturing views of the passing rotating blade. The series of images are exposed in response to respective illumination bursts from illumination source 20.

The inventor of the present invention has recognized innovative apparatus, which may allow making use of commercially available digital cameras to measure vibrations of turbine blades while avoiding practical limitations of such cameras, such as shutter speed limitations. More particularly, aspects of the present invention effectively allow visually freezing motion of a fast rotating blade through the use of a relatively high-speed pulsed illumination source arranged to expose a series of images while the shutter of the camera is in an open condition. That is, aspects of the present invention advantageously rely on the capability of a high-speed pulsed illumination source in lieu of relying on the shutter speed of the camera. Aspects of the present invention advantageously allow acquiring visual images with sufficient speed and resolution to monitor high-speed events, such as may indicate the position of a tip of turbine blade passing by viewing probe 23 at linear speeds of approximately up to Mach 1.2 or 890 miles per hour.

In one example embodiment, a monitor 24 may be configured to determine an expected time-of-arrival of a leading edge of the blade into the field of view and/or an expected time-of-departure of a trailing edge of the blade from the field of view. The expected time-of-arrival of the leading edge of the blade may indicate a start of an image acquisition mode (e.g., start of an open shutter condition) of imager 22 and may further indicate a start of the sequence of illumination bursts from illumination source 20 to expose the series of images of the passing blade. The expected time-of-departure of the trailing edge of the blade may be indicative of an end of the image acquisition mode (e.g., end of the open shutter condition) of imager 22 and may be further indicative of an end of the sequence of illumination bursts from illumination source 20.

In one example embodiment, monitor 24 may comprise an optical-based device, such as may involve an optical fiber arrangement 26 configured to illuminate a tip of a passing blade with an illumination spot (e.g., a laser beam, which defines the illumination spot) to detect the passage of the blade by capturing a reflection of the illumination spot. The respective times when the laser spot reflections are detected (e.g., by an associated detector in monitor 24) may be averaged over a number of revolutions of the rotating shaft. This average may be used to calculate the expected time of arrival of a blade being imaged. This average, which may be calculated over many revolutions of the shaft, essentially filters out nonsynchronous vibration of the blade. For example, the expected time of arrival may be processed by a controller 30 to, for example, determine the time when the shutter of imager 22 is to be opened. It will be appreciated that aspects of the present invention allow for substantial versatility regarding shutter operation. For example, the shutter of the imager may be set in an open condition for a relatively long period of time since illumination conditions (e.g., light level) are substantially low (other than during the flashing provided by the illumination bursts). Accordingly, aspects of the present invention provide substantial flexibility regarding shutter operation.

It will be further appreciated that a triggering time for the camera/illumination source may be optionally implemented using a standard reference sensor 25 configured to generate a once-per-revolution (opr) pulse, such as may be generated in response to a notch 27 or other suitable physical indicia on the shaft. For example, to image a desired blade, the trigger time may be established by calculating a delay after detection of each opr pulse, where such delay corresponds to the location of the desired blade. It will be appreciated that the calculated delay may vary based on imager characteristics. As will be appreciated by one skilled in the art, the opr pulse may be used to measure rotational speed (or period of rotation) of the rotating shaft—from which respective delays corresponding to respective blades may be calculated.

In one example embodiment, controller 30 may be configured to determine an expected average position of a tip of the blade based on the expected time-of-arrival of the leading edge of the blade determined by monitor 24. Controller 30 may be further configured to process the series of images of the passing blade from imager 22 to determine an actual position of the tip of the blade. Differences between the expected position and the actual position of the tip of the blade, as may be determined by controller 30, are indicative of one or more vibration modes of the rotating blade.

Figure 3:
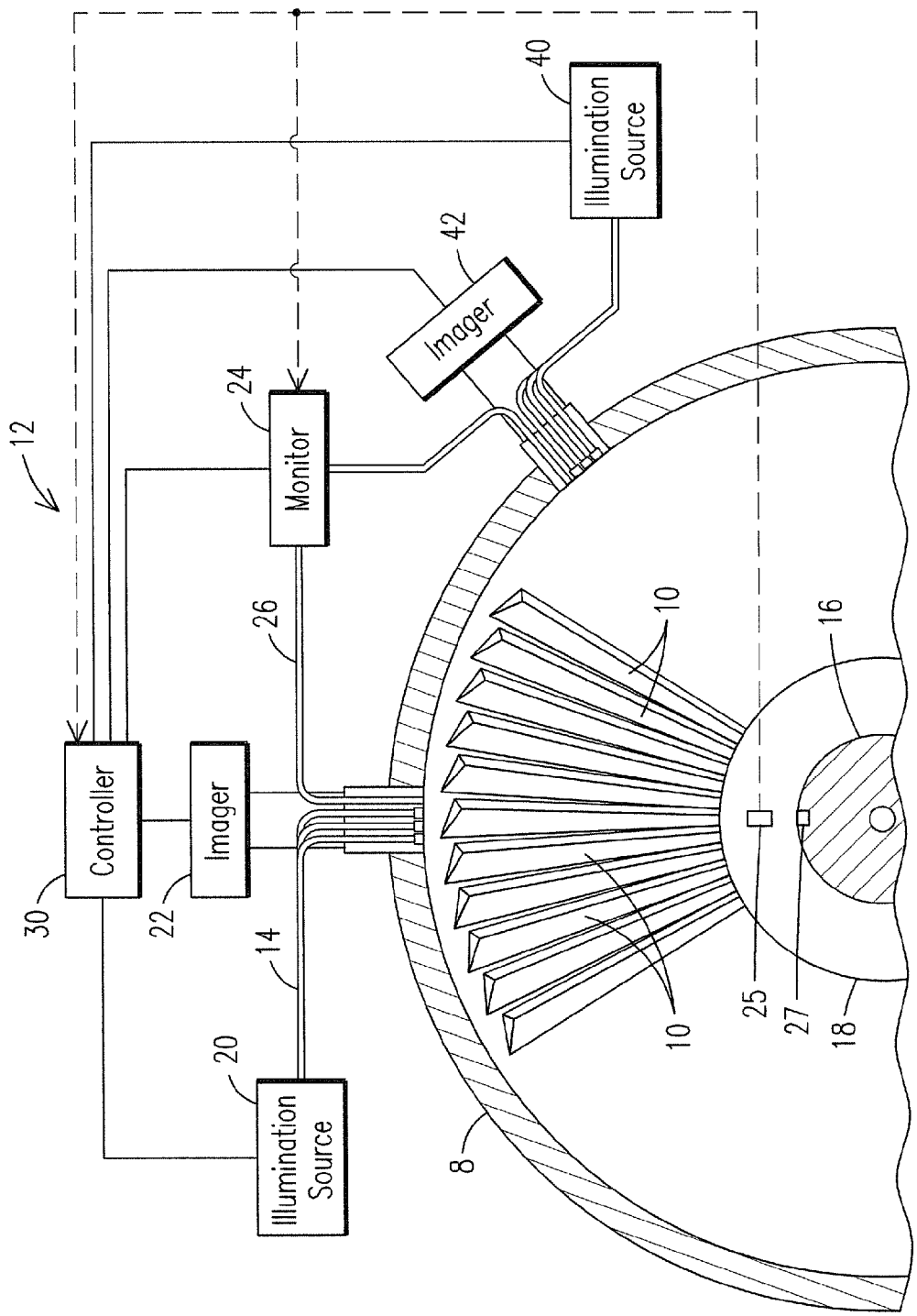
FIG. 3 illustrates an example embodiment, as may be made up of two of more imagers positioned at circumferentially spaced apart locations around the turbine engine.

FIG. 3 schematically illustrates a plurality of further imagers (e.g., imager 42) positioned at circumferentially spaced apart locations around the turbine engine to generate image data comprising respective series of images acquired at the circumferentially spaced apart locations and capturing respective views of the rotating blade. The spaced apart locations may each correspond to relatively accurate predefined positions around the turbine engine. Imager 42 may be responsive to respective sequences of illumination bursts from further illumination sources, such as illumination source 40, to expose the respective series of images of the rotating blade. The respective series of images of the rotating blade may be spatially correlated to one another based on the expected time of arrival of the rotating blade, which may be calculated as discussed above. Visual indicia may result from the illumination spot directed by monitor 18 to the rotating blade. For example, the laser spot generated by monitor 18 may appear to imager 22 as an overexposed spot at an edge of an image of the passing blade. The visual indicia resulting from the illumination spot may be further helpful to spatially correlating to one another the respective series of images acquired at the circumferentially spaced apart locations. The spatial correlation is useful to accurately determine the actual circumferential separation between two or more viewing probes placed around the turbine engine. This measurement should be dynamically performed since the turbine casing may dynamically change (e.g., grow and distort) as a result of changes in temperature, for example. In this manner, the vibration wave measured based on respective series of images acquired through such viewing probes can be combined with an appropriate measured phase between each viewing probe. This spatial correlation may be applied to multiple imagers positioned at circumferentially spaced apart locations around the turbine engine so that the respective series of images from such multiple imagers may be spatially correlated to one another. In this manner, such multiple imagers effectively constitute a group of ganged imagers. For example, a blade tip vibration wave may thus be sampled over a relatively broader wave period, which would be conducive to accurately determining vibration modes involving relatively low vibration frequencies.

Figure 4:
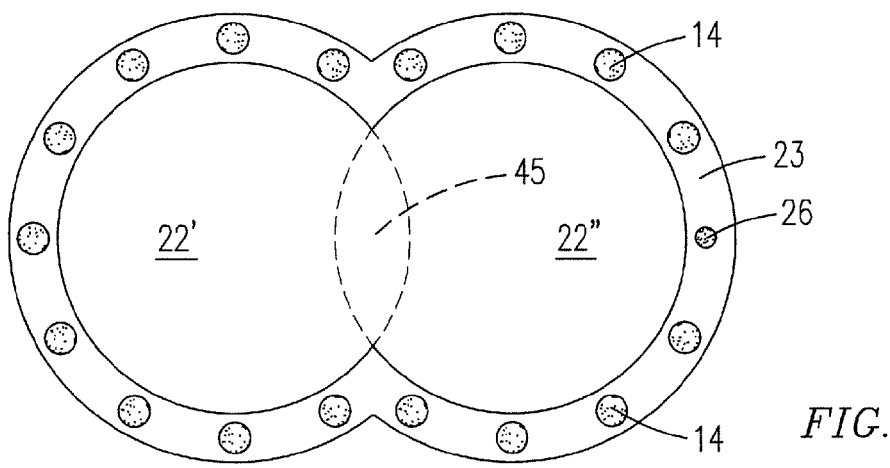
FIG. 4 illustrates an example embodiment, as may be made up of two of more imagers arranged to include a partially intersecting view of a passing rotating blade.

FIG. 4 schematically illustrates at least two imagers 22' and 22" as may be arranged to generate image data comprising respective series of images capturing views of the rotating blade acquired during respective illumination bursts from illumination source 20 (FIG. 1). As illustrated in FIG. 4, imagers 22' and 22" may be arranged to include a partially intersecting view 45 of the passing rotating blade in the respective series of images.

Figure 5:
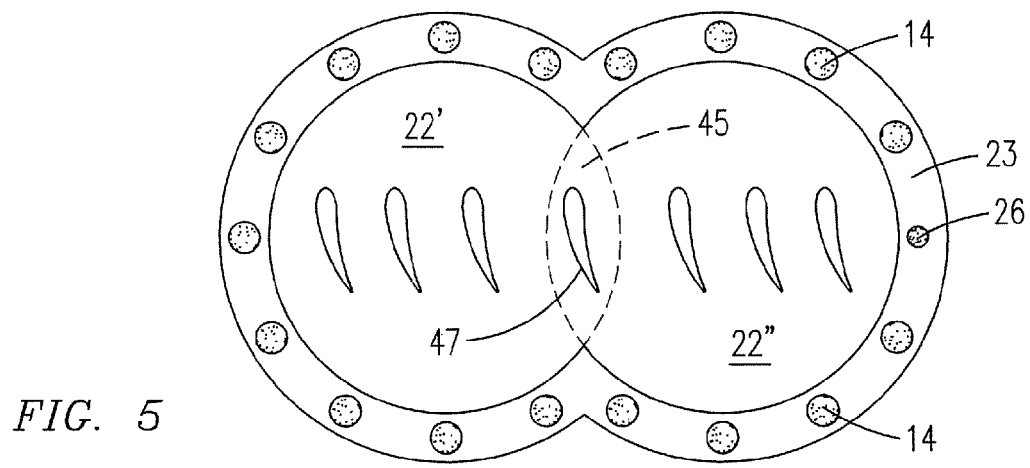
FIG. 5 illustrates example images of a passing tip blade as may be acquired with two of more imagers arranged to include a partially intersecting view of the passing rotating blade.

For example, as illustrated in FIG. 5, a last blade tip image 47 acquired by imager 22' in the partially intersecting view 45 may also constitute a first blade tip image acquired by imager 22" in the partially intersecting view 45. In this manner, the respective series of images from two or more imagers 22' and 22" may be combined, effectively forming a single imager having n times wider aperture compared to an individual imager and having n times the number of pixels compared to the individual imager, where n represents the number of imagers (in this example, n=2) sharing a partially intersecting field of view. In this example, the blade tip vibration wave may also be sampled over a relatively broader wave period, which, as noted above, would be conducive to accurately determining vibration modes involving relatively low vibration frequencies.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. In a gas turbine engine, an apparatus comprising:
an illumination source to generate a sequence of illumination bursts in a field of view capturing a passing rotating blade of the gas turbine engine, wherein said rotating blade is mounted on a rotating shaft;

an imager comprising a digital camera to generate image data comprising a series of images capturing views of the passing rotating blade in the field of view, the series of images exposed in response to respective illumination bursts, further comprising a plurality of further imagers comprising further digital cameras positioned at circumferentially spaced apart locations around the engine to generate image data comprising respective series of images acquired at the circumferentially spaced apart locations and capturing respective views of the rotating blade, the further digital cameras responsive to respective sequences of illumination bursts from further illumination sources to expose the respective series of images of the rotating blade, wherein the respective series of images of the rotating blade are spatially correlated to one another based on an expected time-of-arrival of the leading edge of the rotating blade into respective fields of view of the digital cameras;

a monitor configured to generate an illumination spot directed to said passing blade, wherein the respective series of images comprise visual indicia formed at respective edges of the images in response to the illumination spot directed to said passing blade, wherein the monitor is further configured to determine the expected time-of-arrival of the leading edge of said rotating blade into respective fields of view of the digital cameras based on the visual indicia formed at the respective edges of the images, wherein the expected time-of-arrival of the leading edge of said rotating blade is based on an average of respective times of detection of said visual indicia over a plurality of revolutions of the rotating shaft, wherein the respective series of images of said passing blade are spatially correlated with one another based on the expected time-of-arrival; and a controller to process the series of images to identify at least one vibration mode of the rotating blade.

2. The apparatus of claim 1, wherein said controller is configured to start an image acquisition mode of the digital cameras and to start the sequence of illumination bursts to expose the series of images of the passing blade in response to the expected time-of-arrival.

3. The apparatus of claim 1, further comprising a reference sensor configured to supply a once-per-revolution (opr) pulse, which is temporally delayed by a predefined delay to indicate a start of an image acquisition mode of the digital cameras and is further indicative of a start of the sequence of illumination bursts to expose the series of images of the passing blade.

4. The apparatus of claim 1, further comprising a bundle of optical fibers having a first end coupled to said plurality of illumination sources and a second end disposed along a periphery of a viewing probe to direct the illumination bursts to the field of view.

5. The apparatus of claim 4, further comprising a diffuser lens disposed over the respective second ends of the bundle of optical fibers.

6. The apparatus of claim 1, wherein said plurality of illumination sources are selected from the group consisting of at least one pulsed laser source and at least one Xenon flash device.

7. The apparatus of claim 1, wherein the controller is configured to determine an expected position of a tip of the blade based at least on the expected time-of-arrival, the controller further configured to process the series of images of the passing blade to determine an actual position of a tip of the blade, the controller further configured to determine differences between the expected position and the actual position of the tip of the blade, wherein said differences are indicative of said at least one vibration mode of the rotating blade.

8. The apparatus of claim 1, wherein said digital cameras comprise at least two digital cameras arranged to include a partially intersecting view of the passing rotating blade in the respective series of images.

9. The apparatus of claim 1, wherein the digital cameras comprise respective charge coupled device (CCD) arrays.

10. In a gas turbine engine, an apparatus comprising:

a plurality of illumination sources to generate respective sequences of illumination bursts in respective fields of view capturing at least one passing rotating blade of the gas turbine engine, wherein said at least one rotating blade is mounted on a rotating shaft;

a plurality of imagers comprising respective digital cameras positioned at circumferentially spaced apart locations around the turbine engine to generate image data comprising respective series of images acquired at the circumferentially spaced apart locations and capturing respective views of said at least one rotating blade in response to the respective sequences of illumination bursts;

a monitor configured to generate an illumination spot directed to said at least one passing blade, wherein the respective series of images comprise visual indicia formed at respective edges of the images in response to the illumination spot directed to said at least one passing blade, wherein the monitor is further configured to determine an expected time-of-arrival of a leading edge of said at least one rotating blade into respective fields of view of the digital cameras based on the visual indicia formed at the respective edges of the images, wherein the expected time-of-arrival of the leading edge of said at least one rotating blade is based on an average of respective times of detection of said visual indicia over a plurality of revolutions of the rotating shaft, wherein the respective series of images of said at least one passing blade are spatially correlated with one another based on the expected time-of-arrival; and a controller to process the respective series of images to identify at least one vibration mode in said at least one passing blade.

11. The apparatus of claim 10, wherein said time-of-arrival is indicative of a start of an image acquisition mode of a respective digital camera and is further indicative of a start of a sequence of illumination bursts to expose the respective series of images of said at least one passing blade.

12. The apparatus of claim 10, further comprising a reference sensor configured to supply a once-per-revolution (opr) pulse, which is temporally delayed by respective predefined delays to indicate a start of an image acquisition mode of a respective digital camera and is further indicative of a start of a sequence of illumination bursts to expose the respective series of images of said at least one passing blade.

13. The apparatus of claim 10, further comprising respective bundles of optical fibers having a first end coupled to a respective illumination source and a second end disposed along a periphery of a respective digital camera to direct the illumination bursts to the respective field of view.

14. The apparatus of claim 10, wherein said plurality of illumination sources are selected from the group consisting of at least one pulsed laser source and at least one Xenon flash device.

15. In a gas turbine engine, an apparatus comprising:
- an illumination source to generate a sequence of illumination bursts in a field of view capturing a passing rotating blade of the gas turbine engine, wherein said rotating blade is mounted on a rotating shaft;
- at least two digital cameras associated with the gas turbine engine to generate image data comprising respective series of images capturing views of the rotating blade acquired during respective illumination bursts, wherein said at least two digital cameras are arranged to include a partially intersecting view of the passing rotating blade in the respective series of images;
- a monitor configured to generate an illumination spot directed to said at least one passing blade, wherein the respective series of images comprise visual indicia formed at respective edges of the images in response to the illumination spot directed to said at least one passing blade, wherein the monitor is further configured to determine an expected time-of-arrival of a leading edge of said at least one rotating blade into respective fields of view of the digital cameras based on the visual indicia formed at the respective edges of the images, wherein the expected time-of-arrival of the leading edge of said rotating blade is based on an average of respective times of detection of said visual indicia over a plurality of revolutions of the rotating shaft, wherein the respective series of images of said passing blade are spatially correlated with one another based on the expected time-of-arrival; and
- a controller to process the respective series of images to identify at least one vibration mode of the rotating blade.

16. The apparatus of claim 15, wherein said time-of-arrival is indicative of a start of an image acquisition mode of said at least two digital cameras and is further indicative of a start of the sequence of illumination bursts to expose the series of images of the passing blade.

17. The apparatus of claim 15, further comprising a reference sensor configured to supply a once-per-rev (opr) pulse, which is temporally delayed by a predefined delay to indicate a start of an image acquisition mode of said at least two digital cameras and is further indicative of a start of the sequence of illumination bursts to expose the series of images of the passing blade.

18. The apparatus of claim 15, further comprising:
- a bundle of optical fibers having a first end coupled to the illumination source and a second end disposed along a periphery of the digital cameras to direct the illumination bursts to the field of view; and
- a diffuser lens disposed over the respective second ends of the bundle of optical fibers.

* * * * *